United States Patent
Lagein

Patent Number: 5,947,860
Date of Patent: Sep. 7, 1999

[54] PLANETARY REDUCTION GEAR ASSEMBLY COUPLED TO A POWER TAKEOFF

[76] Inventor: Darrel Lagein, RR1 Box 68, Rock Lake, N. Dak. 58365

[21] Appl. No.: 09/026,344

[22] Filed: Feb. 19, 1998

[51] Int. Cl.$^6$ ............................................. F16H 37/06
[52] U.S. Cl. ................................ 475/331; 74/15.86
[58] Field of Search ........................ 180/53.7; 74/15.66, 74/15.86; 475/331, 218

[56] References Cited

U.S. PATENT DOCUMENTS

| | | | |
|---|---|---|---|
| 1,982,727 | 12/1934 | Eberhard | 74/15.66 |
| 2,878,681 | 3/1959 | Howlett | 74/15.66 |
| 2,968,188 | 1/1961 | Shane et al. | 74/15.66 X |
| 3,070,393 | 12/1962 | Silverberg et al. | 74/15.86 X |
| 3,077,116 | 2/1963 | Gerst | 74/15.86 X |
| 3,296,895 | 1/1967 | Karlsson | 74/15.86 X |
| 4,646,800 | 3/1987 | Wentzell | 180/53.7 X |
| 5,195,402 | 3/1993 | McMillen et al. | 475/218 X |

Primary Examiner—Khoi Q. Ta

[57] ABSTRACT

A new planetary reduction gear assembly for reducing output speed of an agricultural tractor. The inventive device includes an input shaft having an inner portion and an outer portion. The inner portion has a female coupling collar disposed thereon. The female coupling collar is dimensioned for coupling with an outboard shaft of a power take off shaft of a tractor. A gear system is coupled with the outer portion of the input shaft. The gear system includes a central gear coupled with the outer portion of the input shaft. The central gear has three planetary gears engaged thereto. The casing has a rear face, a front face and an outer periphery. The outer periphery has teeth disposed circumferentially on an interior surface thereof. The teeth engage the three planetary gears. The three planetary gears have shafts extending outwardly from central axles thereof. Free ends of the shafts couple with a planetary gear carrier. An output shaft is provided having an inner portion and an outer portion. The output shaft is axially aligned with the input shaft. The inner portion extends inwardly of the front face of the casing and couples with the planetary gear carrier. The outer portion has a plurality of axial grooves disposed thereon. The outer portion is adapted for engaging a female inlet port of a selected piece of power equipment.

9 Claims, 2 Drawing Sheets

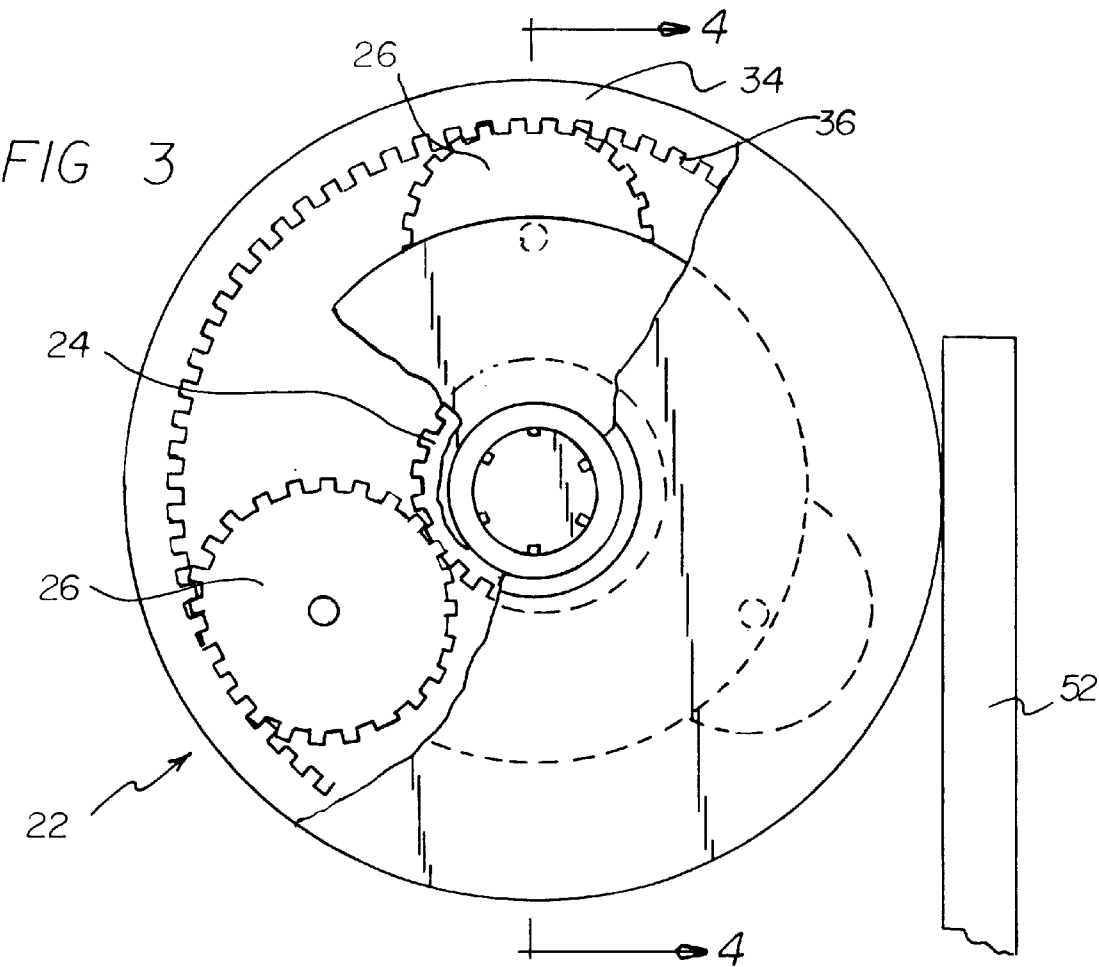
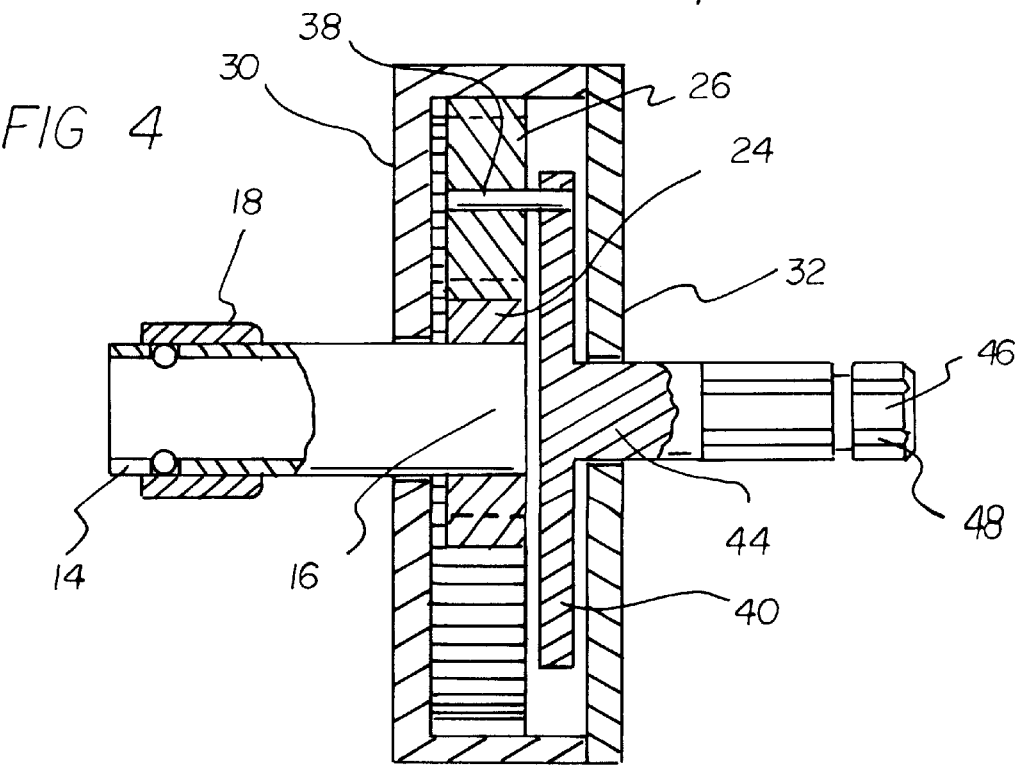

PLANETARY REDUCTION GEAR ASSEMBLY COUPLED TO A POWER TAKEOFF

BACKGROUND OF THE INVENTION

1. Field of the Invention

The present invention relates to speed change apparatuses and more particularly pertains to a new planetary reduction gear assembly for reducing output speed of an agricultural tractor.

2. Description of the Prior Art

The use of speed change apparatuses is known in the prior art. More specifically, speed change apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art speed change apparatuses include U.S. Pat. No. 4,611,504 to Rundle; U.S. Pat. No. 4,362,070 to Murayama et al; U.S. Pat. No. Des. 262,032 to Totsu; U.S. Pat. No. 5,391,125 to Turra et al.; U.S. Pat. No. 4,141,424 to Muayama et al.; and U.S. Pat. No. Des. 262,033 to Totsu.

While these devices fulfill their respective, particular objectives and requirements, the aforementioned patents do not disclose a new planetary reduction gear assembly. The inventive device includes an input shaft having an inner portion and an outer portion. The inner portion has a female coupling collar disposed thereon. The female coupling collar is dimensioned for coupling with an outboard shaft of a power take off shaft of a tractor. A gear system is coupled with the outer portion of the input shaft. The gear system includes a central gear coupled with the outer portion of the input shaft. The central gear has three planetary gears engaged thereto. The three planetary gears are positioned at 120 degree intervals with respect to the central gear. The gear system includes a casing. The casing has a rear face, a front face and an outer periphery. The outer periphery has teeth disposed circumferentially on an interior surface thereof. The teeth engage the three planetary gears. The three planetary gears have shafts extending outwardly from central axles thereof. Free ends of the shafts couple with a planetary gear carrier. An output shaft is provided having an inner portion and an outer portion. The output shaft is axially aligned with the input shaft. The inner portion extends inwardly of the front face of the casing and couples with the planetary gear carrier. The outer portion has a plurality of axial grooves disposed thereon. The outer portion is adapted for engaging a female inlet port of a selected piece of power equipment. A support brace is secured to and extends tangentially from the casing of the gear system. The support brace has a chain coupled with a free end thereof for securement of the support brace with a drawbar of the tractor.

In these respects, the planetary reduction gear assembly according to the present invention substantially departs from the conventional concepts and designs of the prior art, and in so doing provides an apparatus primarily developed for the purpose of reducing output speed of an agricultural tractor.

SUMMARY OF THE INVENTION

In view of the foregoing disadvantages inherent in the known types of speed change apparatuses now present in the prior art, the present invention provides a new planetary reduction gear assembly construction wherein the same can be utilized for reducing output speed of an agricultural tractor.

The general purpose of the present invention, which will be described subsequently in greater detail, is to provide a new planetary reduction gear assembly apparatus and method which has many of the advantages of the speed change apparatuses mentioned heretofore and many novel features that result in a new planetary reduction gear assembly which is not anticipated, rendered obvious, suggested, or even implied by any of the prior art speed change apparatuses, either alone or in any combination thereof.

To attain this, the present invention generally comprises an input shaft having an inner portion and an outer portion. The inner portion has a female coupling collar disposed thereon. The female coupling collar is dimensioned for coupling with an outboard shaft of a power take off shaft of a tractor. A gear system is coupled with the outer portion of the input shaft. The gear system includes a central gear coupled with the outer portion of the input shaft. The central gear has three planetary gears engaged thereto. The three planetary gears are positioned at 120 degree intervals with respect to the central gear. The gear system includes a casing. The casing has a rear face, a front face and an outer periphery. The outer periphery has teeth disposed circumferentially on an interior surface thereof. The teeth engage the three planetary gears. The three planetary gears have shafts extending outwardly from central axles thereof. Free ends of the shafts couple with a planetary gear carrier. An output shaft is provided having an inner portion and an outer portion. The output shaft is axially aligned with the input shaft. The inner portion extends inwardly of the front face of the casing and couples with the planetary gear carrier. The outer portion has a plurality of axial grooves disposed thereon. The outer portion is adapted for engaging a female inlet port of a selected piece of power equipment. A support brace is secured to and extends tangentially from the casing of the gear system. The support brace has a chain coupled with a free end thereof for securement of the support brace with a drawbar of the tractor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new planetary reduction gear assembly apparatus and method which has many of the advantages of the speed change apparatuses mentioned heretofore and many novel features that result in a new planetary reduction gear assembly which is not anticipated, rendered obvious, suggested, or even implied by any of the prior art speed change apparatuses, either alone or in any combination thereof.

It is another object of the present invention to provide a new planetary reduction gear assembly which may be easily and efficiently manufactured and marketed.

It is a further object of the present invention to provide a new planetary reduction gear assembly which is of a durable and reliable construction.

An even further object of the present invention is to provide a new planetary reduction gear assembly which is susceptible of a low cost of manufacture with regard to both materials and labor, and which accordingly is then susceptible of low prices of sale to the consuming public, thereby making such planetary reduction gear assembly economically available to the buying public.

Still yet another object of the present invention is to provide a new planetary reduction gear assembly which provides in the apparatuses and methods of the prior art some of the advantages thereof, while simultaneously overcoming some of the disadvantages normally associated therewith.

Still another object of the present invention is to provide a new planetary reduction gear assembly for reducing output speed of an agricultural tractor.

Yet another object of the present invention is to provide a new planetary reduction gear assembly which includes an input shaft having an inner portion and an outer portion. The inner portion has a female coupling collar disposed thereon. The female coupling collar is dimensioned for coupling with an outboard shaft of a power take off shaft of a tractor. A gear system is coupled with the outer portion of the input shaft. The gear system includes a central gear coupled with the outer portion of the input shaft. The central gear has three planetary gears engaged thereto. The casing has a rear face, a front face and an outer periphery. The outer periphery has teeth disposed circumferentially on an interior surface thereof. The teeth engage the three planetary gears. The three planetary gears have shafts extending outwardly from central axles thereof. Free ends of the shafts couple with a planetary gear carrier. An output shaft is provided having an inner portion and an outer portion. The output shaft is axially aligned with the input shaft. The inner portion extends inwardly of the front face of the casing and couples with the planetary gear carrier. The outer portion has a plurality of axial grooves disposed thereon. The outer portion is adapted for engaging a female inlet port of a selected piece of power equipment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention as taken along line 3—3 of FIG. 2.

FIG. 4 is a cross-sectional view of the present invention as taken along line 4—4 of FIG. 3.

DESCRIPTION OF THE PREFERRED EMBODIMENT

Figure 1:
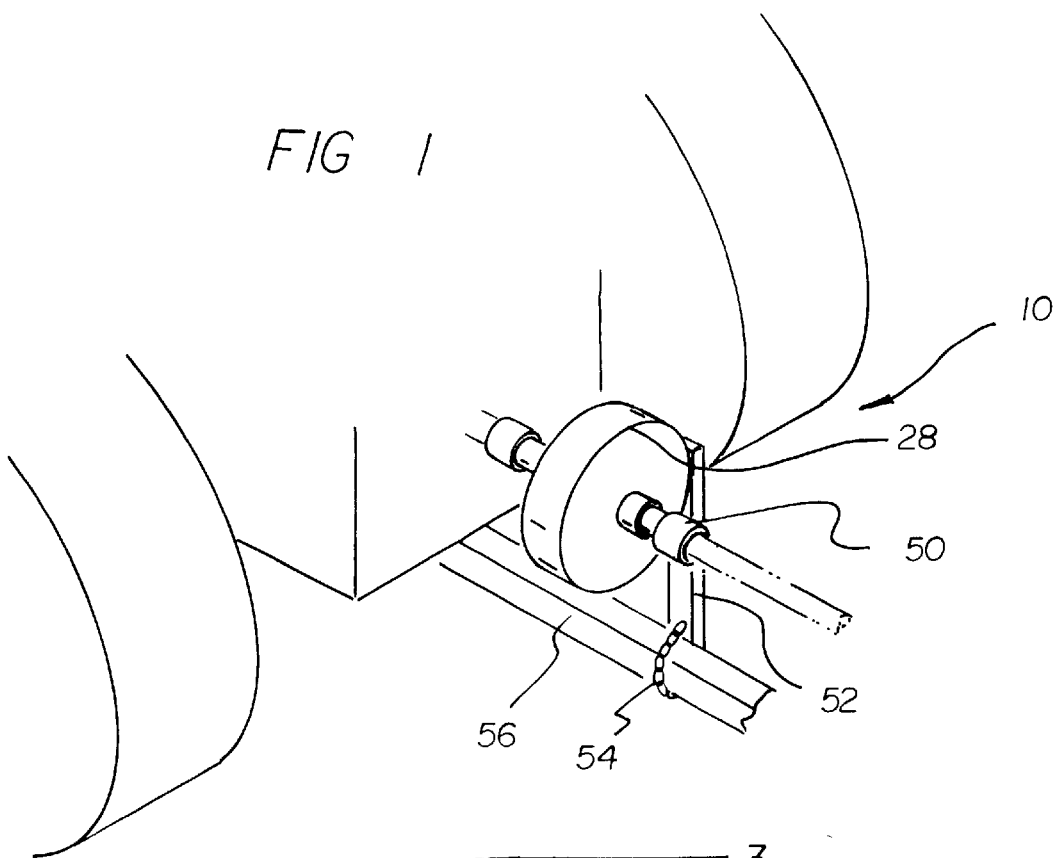
FIG. 1 is a perspective view of a new planetary reduction gear assembly according to the present invention.
Figure 2:
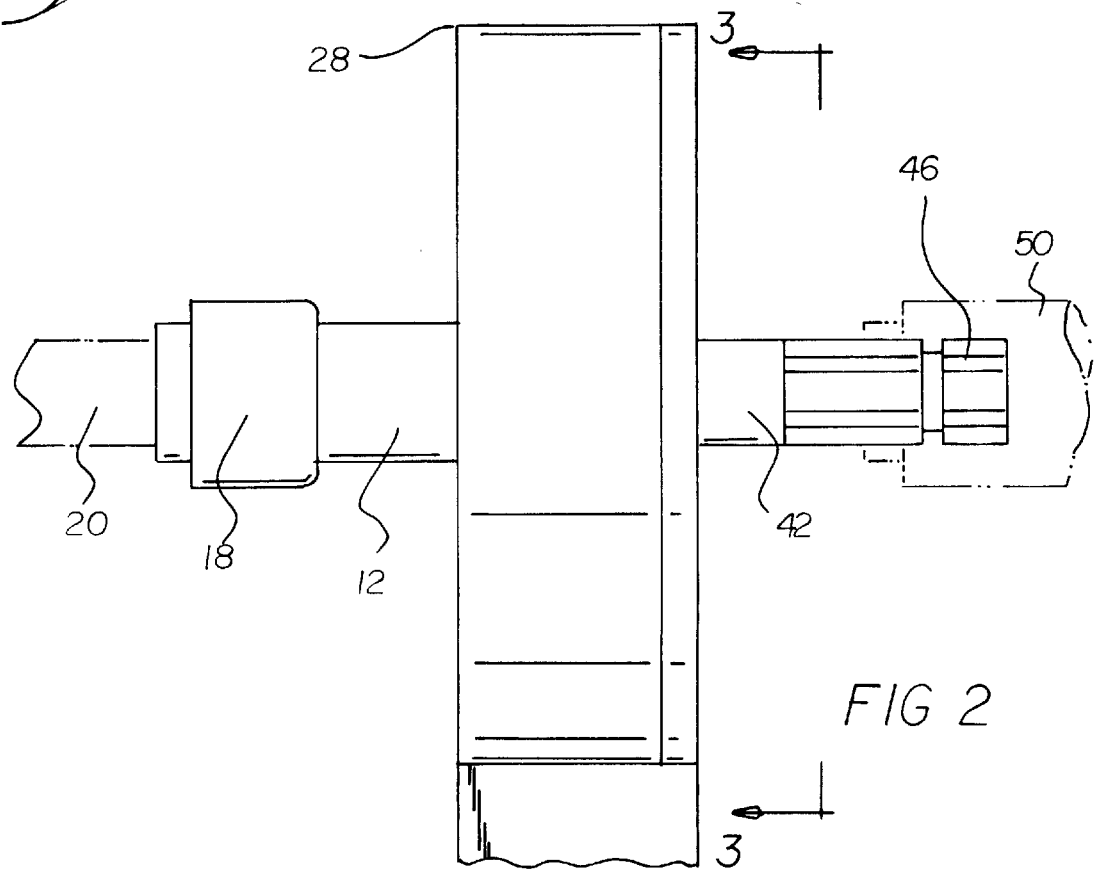
FIG. 2 is a side elevation view of the present invention.

With reference now to the drawings, and in particular to FIGS. 1 through 4 thereof, a new planetary reduction gear assembly embodying the principles and concepts of the present invention and generally designated by the reference numeral 10 will be described.

As best illustrated in FIGS. 1 through 4, the planetary reduction gear assembly 10 comprises an input shaft 12 having an inner portion 14 and an outer portion 16. The inner portion 14 has a female coupling collar 18 disposed thereon. The female coupling collar 18 is dimensioned for coupling with an outboard shaft 20 of a power take off shaft of a tractor.

A gear system 22 is coupled with the outer portion 16 of the input shaft 12. The gear system 22 includes a central gear 24 coupled with the outer portion 16 of the input shaft 12. The central gear 24 has three planetary gears 26 engaged thereto. The three planetary gears 26 are positioned at 120 degree intervals with respect to the central gear 24. The gear system 22 includes a casing 28. The casing 28 has a rear face 30, a front face 32 and an outer periphery 34. The outer periphery 34 has teeth 36 disposed circumferentially on an interior surface thereof. The teeth 36 engage the three planetary gears 26. The three planetary gears 26 have shafts 38 extending outwardly from central axles thereof. Free ends of the shafts 38 couple with a planetary gear carrier 40.

An output shaft 42 is provided having an inner portion 44 and an outer portion 46. The output shaft 42 is axially aligned with the input shaft 12. The inner portion 44 extends inwardly of the front face 32 of the casing 28 and couples with the planetary gear carrier 40. The outer portion 46 has a plurality of axial grooves 48 disposed thereon. The outer portion 46 is adapted for engaging a female inlet port 50 of a selected piece of power equipment.

A support brace 52 is secured to and extends tangentially from the casing 28 of the gear system 22. The support brace 52 has a chain 54 coupled with a free end thereof for securement of the support brace 52 with a drawbar 56 of the tractor.

In use, the present invention will reduce the output speed of an agricultural tractor from 1,000 revolutions per minute to 540 revolutions per minute. The female coupling 18 on the inner portion 14 of the inner shaft 12 includes twenty-one splines on an interior surface thereof for coupling with the power take off shaft of the tractor. The present invention would enable many larger tractors to be used in conjunction with implements designed to operate at 540 revolutions per minute. It could be installed in a relatively short period of time, while its simple, rugged construction would make it extremely durable and reliable.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new planetary reduction gear assembly for reducing output speed of an agricultural tractor comprising, in combination:

an input shaft having an inner portion and an outer portion, the outer portion having a female coupling collar disposed thereon, the female coupling collar dimensioned for coupling with an outboard shaft of a power take off shaft of a tractor;

a gear system coupled with the outer portion of the input shaft, the gear system including a central gear coupled with the outer portion of the input shaft, the central gear having three planetary gears engaged thereto, the three planetary gears being positioned at 120 degree intervals with respect to the central gear, the gear system including a casing, the casing having a rear face, a front face and an outer periphery, the outer periphery having teeth disposed circumferentially on an interior surface thereof, the teeth engaging the three planetary gears, the three planetary gears having shafts extending outwardly from central axles thereof, free ends of the shafts coupling with a planetary gear carrier;

an output shaft having an inner portion and an outer portion, the output shaft being axially aligned with the input shaft, the inner portion extending inwardly of the front face of the casing and coupling with the planetary gear carrier, the outer portion having a plurality of axial grooves disposed thereon, the outer portion adapted for engaging a female inlet port of a selected piece of power equipment; and a support brace secured to and extending tangentially from the casing of the gear system, the support brace having a chain coupled with a free end thereof for securement of the support brace with a drawbar of the tractor.

2. A new planetary reduction gear assembly for reducing output speed of an agricultural tractor comprising, in combination:

an input shaft having an inner portion and an outer portion, the outer portion having a female coupling collar disposed thereon, the female coupling collar dimensioned for coupling with an outboard shaft of a power take off shaft of a tractor;

a gear system coupled with the outer portion of the input shaft, the gear system including a central gear coupled with the outer portion of the input shaft, the central gear having three planetary gears engaged thereto, the gear system including a casing, the casing having a rear face, a front face and an outer periphery, the outer periphery having teeth disposed circumferentially on an interior surface thereof, the teeth engaging the three planetary gears, the three planetary gears having shafts extending outwardly from central axles thereof, free ends of the shafts coupling with a planetary gear carrier;

an output shaft having an inner portion and an outer portion, the output shaft being axially aligned with the input shaft, the inner portion extending inwardly of the front face of the casing and coupling with the planetary gear carrier, the outer portion having a plurality of axial grooves disposed thereon, the outer portion adapted for engaging a female inlet port of a selected piece of power equipment; and further including a support brace secured to and extending tangentially from the casing of the gear system, the support brace having a chain coupled with a free end thereof for securement of the support brace with a drawbar of the tractor.

3. A planetary reduction gear assembly for reducing output speed of an agricultural tractor, the planetary reduction gear assembly comprising;:

an input shaft adapted for coupling to a power take off shaft of a tractor such that rotation of the power take off shaft rotates the input shaft;

a gear system being coupled to the input shaft such that rotation of the input shaft rotates gears of the gear system;

an output shaft being coupled to the gear system such that rotation of the gears of the gear system rotates the output shaft, the gears of the gear system rotating the output shaft at a rate of revolution less than a rate of revolution at which the input shaft is rotated;

the gear system having a casing enclosing the gears of the gear system; and a support brace being coupled to the casing of the gear system, the support brace having an elongate flexible element coupled thereto for securing of the support brace with a draw bar of the tractor.

4. The planetary reduction gear assembly of claim 3, wherein the input shaft has an inner portion and an outer portion, the outer portion having a female coupling collar disposed thereon, the female coupling collar dimensioned for coupling with an outboard shaft of the power take off shaft of the tractor.

5. The planetary reduction gear assembly of claim 4, wherein the gear system includes a central gear coupled with the outer portion of the input shaft, the central gear having three planetary gears engaged thereto, the three planetary gears being positioned at 120 degree intervals with respect to the central gear, wherein the casing has a rear face, a front face and an outer periphery, the outer periphery of the casing having teeth disposed circumferentially on an interior surface thereof, the teeth engaging the three planetary gears, the three planetary gears having shafts extending outwardly from central axles thereof, free ends of the shafts coupling with a planetary gear carrier.

6. The planetary reduction gear assembly of claim 5, wherein the output shaft has an inner portion and an outer portion, the output shaft being axially aligned with the input shaft, the inner portion extending inwardly of the front face of the casing and coupling with the planetary gear carrier, the outer portion having a plurality of axial grooves disposed thereon, the outer portion adapted for engaging a female inlet port of a selected piece of power equipment.

7. The planetary reduction gear assembly of claim 3, wherein the support brace is extended tangentially to the casing.

8. The planetary reduction gear assembly of claim 3, wherein the elongate flexible element is coupled to a free end of the support brace distal the casing.

9. The planetary reduction gear assembly of claim 3, wherein the elongate flexible element comprises a length of chain.

\* \* \* \* \*